United States Patent
Fujioka et al.

(10) Patent No.: US 7,353,730 B2
(45) Date of Patent: Apr. 8, 2008

(54) FOOT DEPRESSING PARKING BRAKE APPARATUS

(75) Inventors: Shinji Fujioka, Saitama (JP); Masateru Momozu, Saitama (JP); Takayuki Kato, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 11/200,072

(22) Filed: Aug. 10, 2005

(65) Prior Publication Data

US 2006/0053952 A1 Mar. 16, 2006

(30) Foreign Application Priority Data

Aug. 24, 2004 (JP) ............ P. 2004-243049

(51) Int. Cl.
G05G 1/14 (2006.01)
G05G 1/00 (2006.01)
G05G 3/00 (2006.01)

(52) U.S. Cl. ............ 74/512; 74/575; 74/576; 74/577 R; 74/577 S; 74/576 SF; 74/578; 74/542; 74/560

(58) Field of Classification Search ........ 74/512–514, 74/560, 542, 575, 576, 577 R, 577 S, 576 SF, 74/578; 188/265, 2 D; B60T 7/06
See application file for complete search history.

(56) References Cited

U.S. PATENT DOCUMENTS 4,872,368 A * 10/1989 Porter ................ 74/542
5,217,094 A * 6/1993 Walter et al. .......... 188/2 D
6,508,341 B1 * 1/2003 Hiura ................. 188/265

FOREIGN PATENT DOCUMENTS

| JP | 64-18755 | * | 1/1989 |
| JP | 2001-10456 | * | 1/2001 |
| JP | 2002-302024 | * | 10/2002 |
| JP | 2003-237552 A | | 8/2003 |
| JP | 2005-297722 | * | 10/2005 |

OTHER PUBLICATIONS

Webster's II New Riverside University Dictionary, 1994, p. 384.*
"Discontinuous." The American Heritage Dictionary, 4th Ed. 2000, www.bartleby.com/61/D0259100.html.*
"Discontinuity" Merriam Webster OnLine, www.m-w.com/dictionary/discontinuity, 2006-2007.*
Classification of discontinuities, http://en.wikipedia.org/wiki/Classification_of_discontinuities, May 30, 2007.*

* cited by examiner

Primary Examiner—Vinh T. Luong
(74) Attorney, Agent, or Firm—Arent Fox LLP

(57) ABSTRACT

A foot depressing parking brake apparatus including a brake pedal main body 3 pivotably supported by a support shaft 2, a ratchet plate 4 having ratchet teeth 4b and attached to the brake pedal main body 3, a ratchet pole 6 rotatably attached to a pivot pin 5 and constituting a shaft hole inserted with the pivot pin 5 by a long hole 7, and a toggle spring 10 for exerting a turning force to the ratchet pole 6, wherein a brake operating state in which a claw portion 6a of the ratchet pole 6 is brought in mesh with the ratchet teeth 4b of the ratchet plate 4 and a brake releasing state in which the meshing is released are realized.

7 Claims, 7 Drawing Sheets

FOOT DEPRESSING PARKING BRAKE APPARATUS

BACKGROUND OF THE INVENTION

1. Technical Field

This application claims foreign priority under 35 USC 119 based on Japanese Patent Application 2004-243049, filed Aug. 24, 2004, the contents of which are incorporated herein by reference. This priority claim is being made concurrently with the filing of this application.

The present invention relates to a foot depressing parking brake apparatus provided mainly in an automobile.

2. Related Art

In a background art, there is known a foot depressing parking brake apparatus having a brake pedal of a foot depressing type, bringing about a brake operating state by depressing the brake pedal and maintaining a state of locking the brake pedal by a ratchet mechanism.

For example, there is proposed a foot depressing parking brake apparatus having a constitution of attaching a ratchet plate to a pedal main body of a foot depressing parking brake pivoted centering on a fulcrum by being operated to depress by the foot, bringing teeth of a ratchet pole rotatably attached to a pivot pin in mesh with the ratchet plate, forming a shaft hole of the ratchet pole inserted with the pivot pin by a long hole and provided with a toggle spring for exerting a turning force to the ratchet pole (refer to, for example, Patent Reference 1). According to the foot depressing parking brake apparatus described in Patent Reference 1, the ratchet pole is slid along the long hole by the turning force and a depressing force operated to the pedal main body and a braking operation and a brake releasing operation can be carried out alternately by depressing the pedal main body.

[Patent Reference 1]
  JP-A-2003-237552

DISCLOSURE OF THE INVENTION

In such a parking brake apparatus of the foot depressing type, a reduction in a number of parts is requested with an object of a further reduction in cost, a reduction in a number of integrating steps and the like. Further, in the ratchet mechanism, also emittance of strange sound in accordance with contact of metals poses a problem and an improvement therein is also desired.

For example, although, for example, in order to resolve the strange sound, it is investigated to attach resin-molded contact portions to contact portions of metals, the attachment gives rise to an increase in a number of parts. Further, although it is investigated to attach a reset arm separately from the ratchet plate to avoid contact of metals in sliding the ratchet pole, when the ratchet plate and the reset arm are formed as separate members, the number of parts is invariably increased.

SUMMARY OF THE INVENTION

The invention is proposed in view of such an actual situation of the background art. That is, it is an object of the invention to provide a foot depressing type parking brake apparatus simplifying a constitution of the apparatus and capable of being fabricated inexpensively while making full use of an advantage of the foot depressing parking brake apparatus of the background art type. Further, it is an object of the invention to provide a foot depressing parking brake apparatus without emittance of strange sound by contact of metals and also capable of reducing a number of parts.

In order to achieve the above-described object, there is provided with a foot depressing parking brake apparatus including: a brake pedal main body pivotably supported by a support shaft, a ratchet plate having ratchet teeth and attached to the brake pedal main body, a ratchet pole rotatably attached to a pivot pin and constituting a shaft hole thereof inserted with the pivot pin by a long hole, and a toggle spring for exerting a turning force to the ratchet pole, wherein by sliding the ratchet pole along the shaft hole constituting the long hole by the turning force by the toggle spring and a force of depressing the pedal main body, a brake operating state in which a claw portion of the ratchet pole is brought in mesh with the ratchet teeth of the ratchet plate and a brake releasing state in which the meshing is released are realized, the ratchet plate is integrally provided with a reset arm portion for restricting an attitude of the ratchet pole in releasing a brake, and a base end portion of the reset arm portion is formed with an escaping portion in correspondence with the sliding operation in releasing the brake.

According to the foot depressing parking brake apparatus of the invention, the ratchet plate is provided with the reset arm portion for restricting the attitude of the ratchet pole in releasing the brake and therefore, a number of parts is reduced in comparison with that in the case of forming the ratchet plate and the reset arm portion as members separate from each other. Further, the base end portion of the reset arm portion integrally provided with the ratchet plate is provided with the escaping portion in correspondence with the sliding operation of the ratchet pole in releasing the brake and therefore, when the reset pole is slid, metals (the ratchet pole and the reset arm portion) are not brought into contact with each other and emittance of strange sound is resolved.

According to the invention, it is possible to provide the foot depressing type parking brake apparatus without emittance of strange sound by contact of metals, capable of reducing the number of parts, simplifying the apparatus constitution and capable of being fabricated inexpensively.

DETAILED DESCRIPTION OF THE PREFERRED EMBODIMENTS

A detailed explanation will be given of a foot depressing parking brake apparatus applied with the invention in reference to the drawings as follows.

Figure 1:
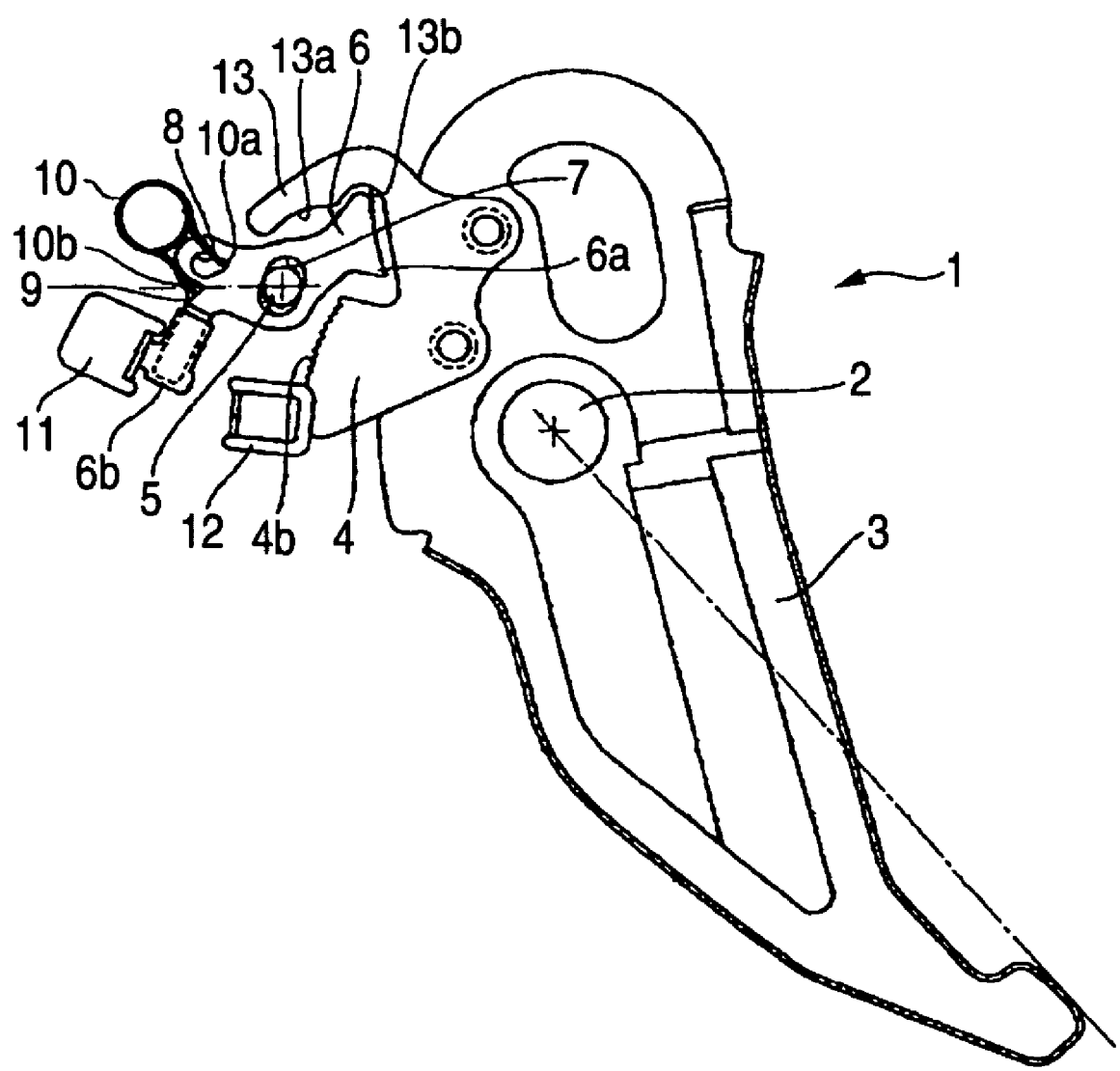
FIG. 1 shows an example of a foot depressing parking brake apparatus applied with the invention and is a side view showing a pedal initial state.

FIG. 1 shows a constitution example of a foot depressing parking brake apparatus applied with the invention and is a drawing showing a pedal initial state. The foot depressing parking brake apparatus 1 is fixed to a main body of an automobile by an attaching frame, a pedal main body 3 of a foot depressing brake pedal is pivotably attached to a support shaft 2 provided at the attaching frame, when the pedal is depressed by the foot, the pedal is pivoted against a return spring (illustration thereof is omitted), and a brake wire (illustration thereof is omitted) connected to the pedal main body 3 of the foot depressing parking brake apparatus is pulled to thereby operate the brake.

The pedal main body 3 is integrally attached with a ratchet plate 4 having ratchet teeth 4b, and a claw portion 6a of a ratchet pole 6 rotatably attached to a pivot pin 5 of the attaching frame is set to be brought in mesh with the ratchet teeth 4b of the ratchet plate 4.

The pivot pin 5 is inserted into a long hole 7 formed at the ratchet pole 6, a spring hole 8 formed at the ratchet pole 6 is engaged with one leg portion 10a of a toggle spring 10, a spring hole 9 of the attaching frame is engaged with other leg portion 10b of the toggle spring 10, and the ratchet pole 6 is constituted to be exerted with a turning force and a sliding force.

Further, the ratchet pole 6 is also provided with a stop arm portion 6b and both sides thereof are provided with a stopper 11 for restricting rotation of the ratchet pole 6 in a direction of bringing the claw portion 6a and the ratchet teeth 4b in mesh with each other, and a stopper 12 for restricting rotation thereof in a direction reverse thereto.

On the other hand, the ratchet plate 4 is provided with a reset arm portion 13 for switching a direction of a force of the toggle spring 10 integrally with the ratchet plate 4 such that by an operation of returning the pedal main body 3 when the ratchet pole 6 is disengaged from being brought in mesh with the ratchet plate 4, the ratchet pole 6 can be brought in mesh therewith again.

Figure 5:
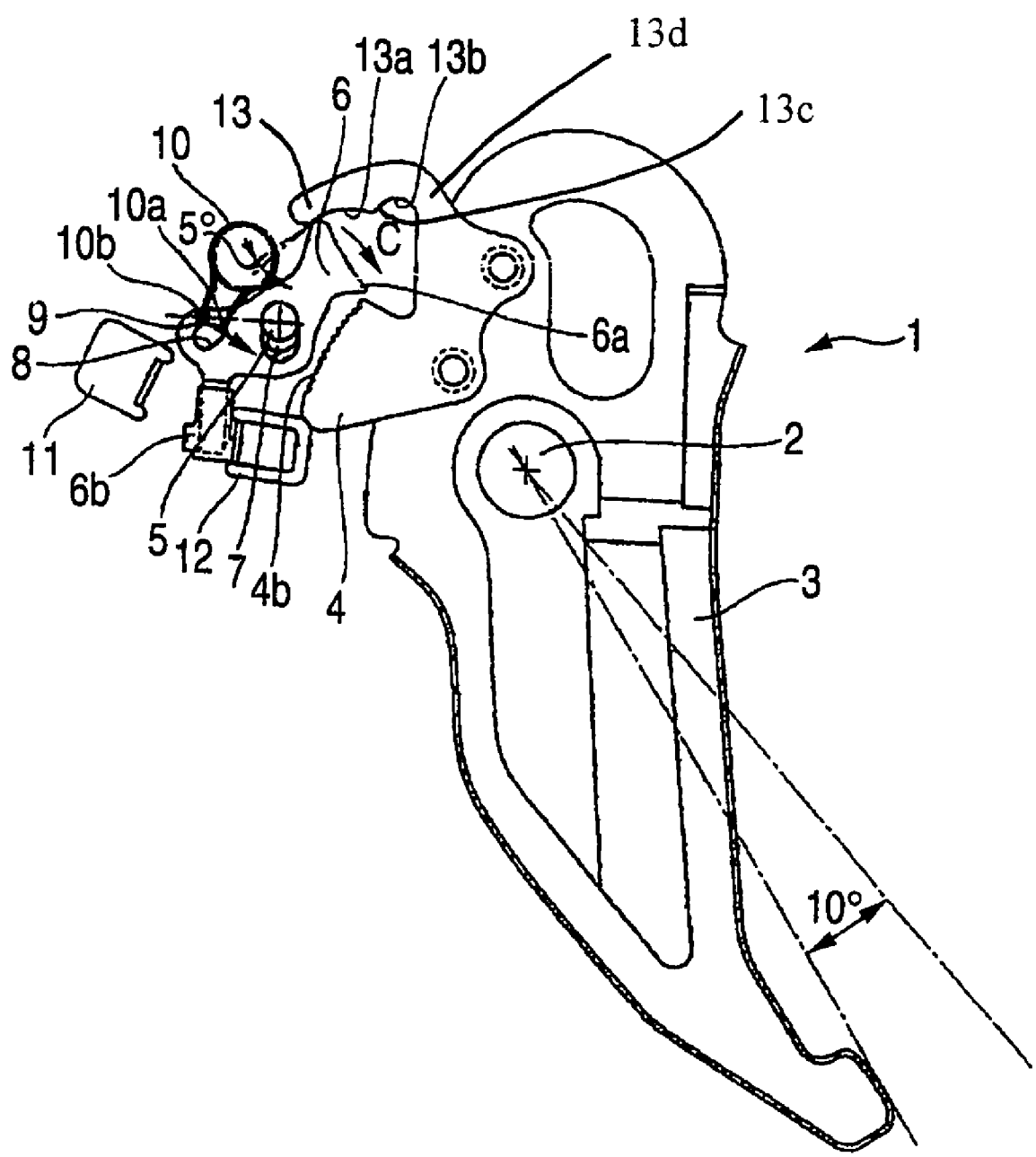
FIG. 5 is a side view showing an initial state of bringing a ratchet pole and a reset arm portion into contact with each other.

The reset arm portion 13 is provided with a bent portion 13a for correcting an attitude of the ratchet pole 6 when the direction of the force of the toggle spring 10 is controlled to switch, and a base end portion 13d thereof is provided with an escaping portion 13b such that when the ratchet pole 6 is slid, a front end thereof does not collide therewith. As shown in FIG. 5, the bent portion 13a and escaping portion 13b are separated from each other by a projection 13c disposed therebetween and extending away from a surface of the rest arm portion 13 toward the ratchet pole 6. A shape of the escaping portion 13b is formed as a recess portion following a shape of a corresponding portion of the ratchet pole 6.

Next, an explanation will be given of the operation of the foot depressing parking brake apparatus having the above-described constitution. According to the foot depressing parking brake apparatus, as shown by FIG. 1, when the pedal main body 3 is not depressed to be brought into a state of releasing the brake, the ratchet teeth 4b of the ratchet plate 4 and the claw portion 6a of the ratchet pole 6 are disengaged from being brought in mesh with each other. Further, although at the stage, the ratchet pole 6 is urged in a direction of being brought in mesh therewith by operation of the toggle spring 10, the ratchet pole 6 is stopped at a predetermined position by bringing the stop arm portion 6b into contact with the stopper 11.

Figure 2:
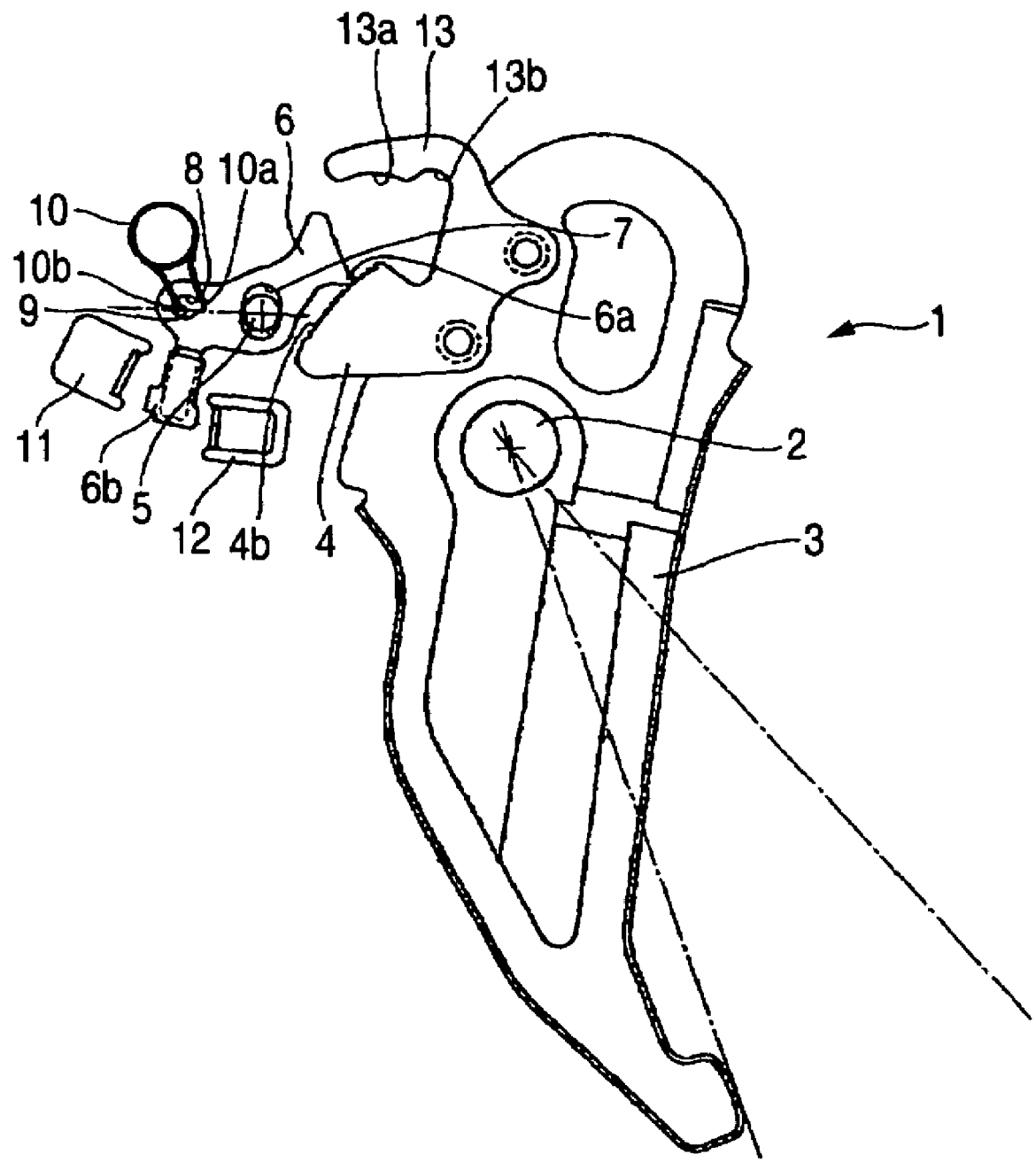
FIG. 2 is a side view showing a ratchet meshing state.

When the pedal main body 3 is depressed for parking, the ratchet pole 6 is lifted against an urge force by the toggle spring 10 by the ratchet plate 4, a lower end of the long hole 7 is engaged with the pivot pin 5, the turning force of the toggle spring 10 is operated to bring the claw portion 6a of the ratchet pole 6 in mesh with the ratchet teeth 4b of the ratchet plate 4 and therefore, as shown by FIG. 2, the ratchet teeth 4b of the ratchet plate 4 and the claw portion 6a of the ratchet pole 6 are brought in mesh with each other.

Figure 3:
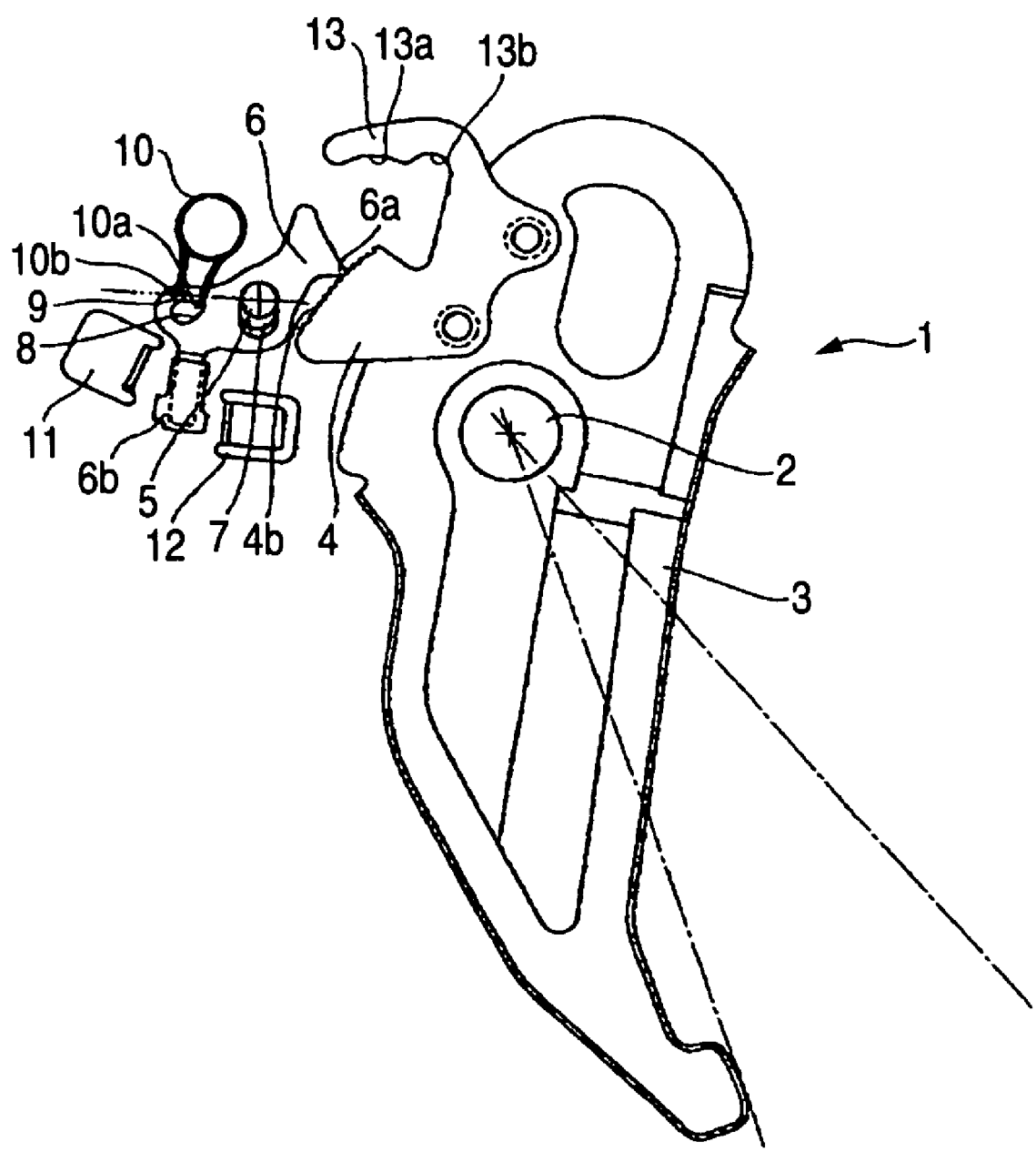
FIG. 3 is a side view showing a brake operating state.

Further, when the depressing is stopped and the foot is detached from the pedal main body 3, the pedal main body 3 is operated with a comparatively large return force in a direction reverse to that in depressing the pedal main body 3 by the brake wire and therefore, the ratchet pole 6 strongly brought in mesh with the ratchet plate 4 integrated with the pedal main body 3 is pushed back, as shown by FIG. 3, the ratchet pole 6 is slid such that an upper end of the long hole 7 is engaged with the pivot pin 5 to thereby finish meshing. By the sliding operation, a point of operating the toggle spring 10 to the ratchet pole 6 (that is, the one leg portion 10a) is moved on a lower side of a line connecting a center of the spring hole 9 of the attaching frame and a center of the pivot pin 5, and a spring force of the toggle spring 10 is operated in a direction of disengaging the ratchet pole 6 from being brought in mesh with the ratchet plate 4. However, at the time point, the force of returning the pedal main body 3 is large and therefore, the ratchet pole 6 is brought in a state of being pressed by the ratchet plate 4 and the meshing is not disengaged.

The above-described is an explanation of operation until a brake operating state, next, an operation will be given of operation when the brake is released. In the case of releasing the brake, when the pedal main body 3 is depressed again and the returning force is nullified, the ratchet pole 6 is rotated to disengage the meshing with the ratchet plate 4 by the force of the toggle spring 10 and when the foot is detached from the pedal main body 3 as it is, the pedal main body 3 is returned to an original position, that is, the position of releasing the brake by the force of the return spring.

Figure 4:
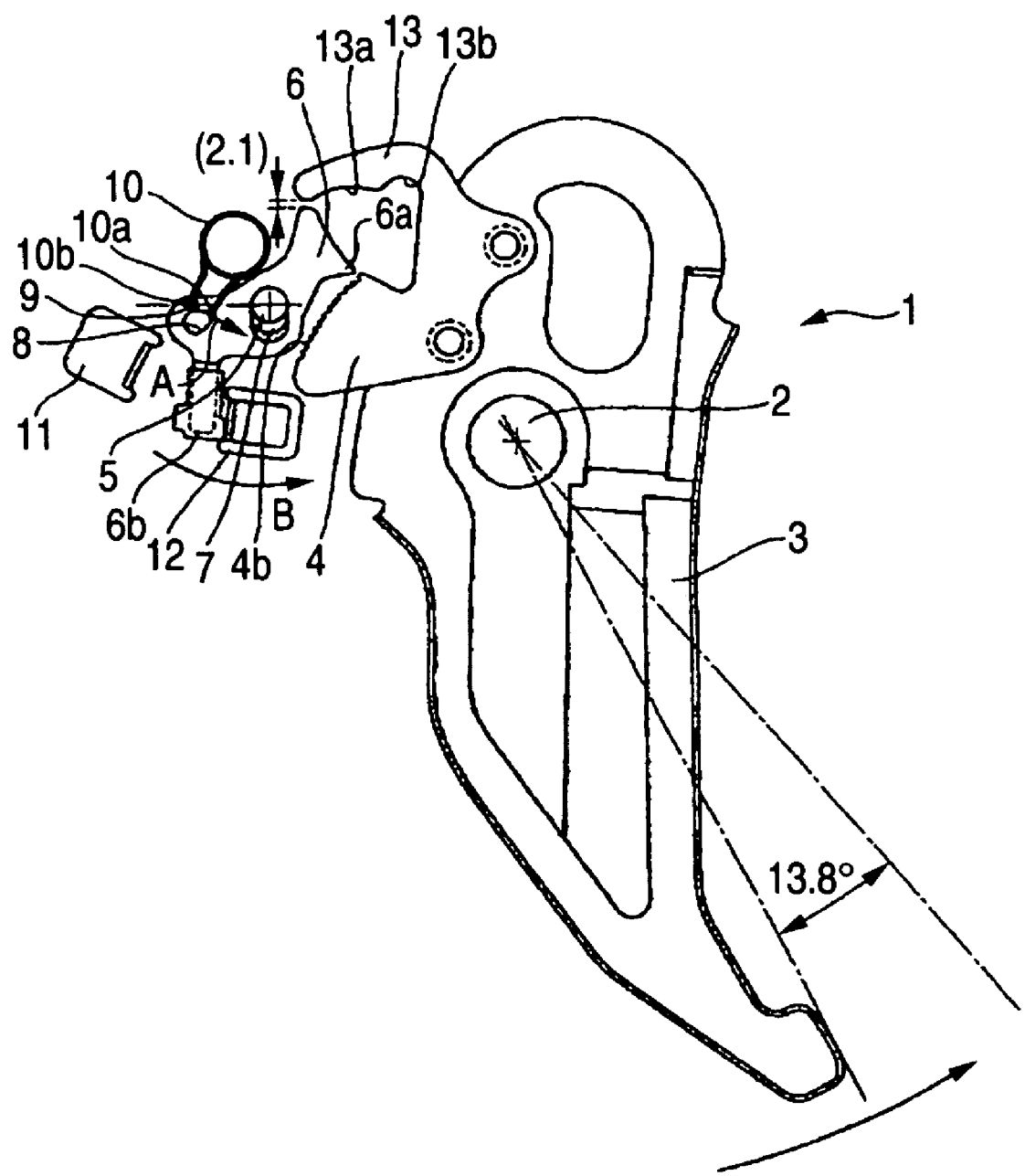
FIG. 4 is a side view showing a state of starting to release a brake.

Specifically, first, in the case of releasing the brake, when the pedal main body 3 is depressed, the force of returning the pedal main body 3 is released. At this occasion, the point of operating the toggle spring 10 to the ratchet pole 6 (that is, the one leg portion 10a) is disposed on the lower side of the line connecting the center of the spring hole 9 of the attaching frame and the center of the pivot pin 5, the ratchet pole 6 is exerted with a spring force in an arrow mark A direction by the toggle spring 10, the ratchet pole 6 is rotated in an arrow mark B direction, and as shown by FIG. 4, the claw portion 6a and the ratchet teeth 4b are disengaged from being brought in mesh with each other. Further, although in a state of disengaging the meshing, the ratchet pole 6 is rotated in the arrow mark B direction as described above, the rotation is stopped at a predetermined position by bringing the stopper arm 6b into contact with the stopper 12.

When the pedal main body 3 is disengaged from being depressed, the pedal main body 3 starts to return to the original position by the force of the return spring. Then, as shown by FIG. 5, the bent portion 13a of the reset arm portion 13 integrally provided with the ratchet plate 4 is brought into contact with a front end of the ratchet pole 6 and an attitude of the ratchet pole 6 is corrected in an arrow mark C direction against the spring force of the toggle spring 10. Further, at this occasion, in order to reduce contact sound, the ratchet pole 6 is brought into contact with the reset arm portion 13 by reducing an angle thereof (for example, 5°).

Figure 6:
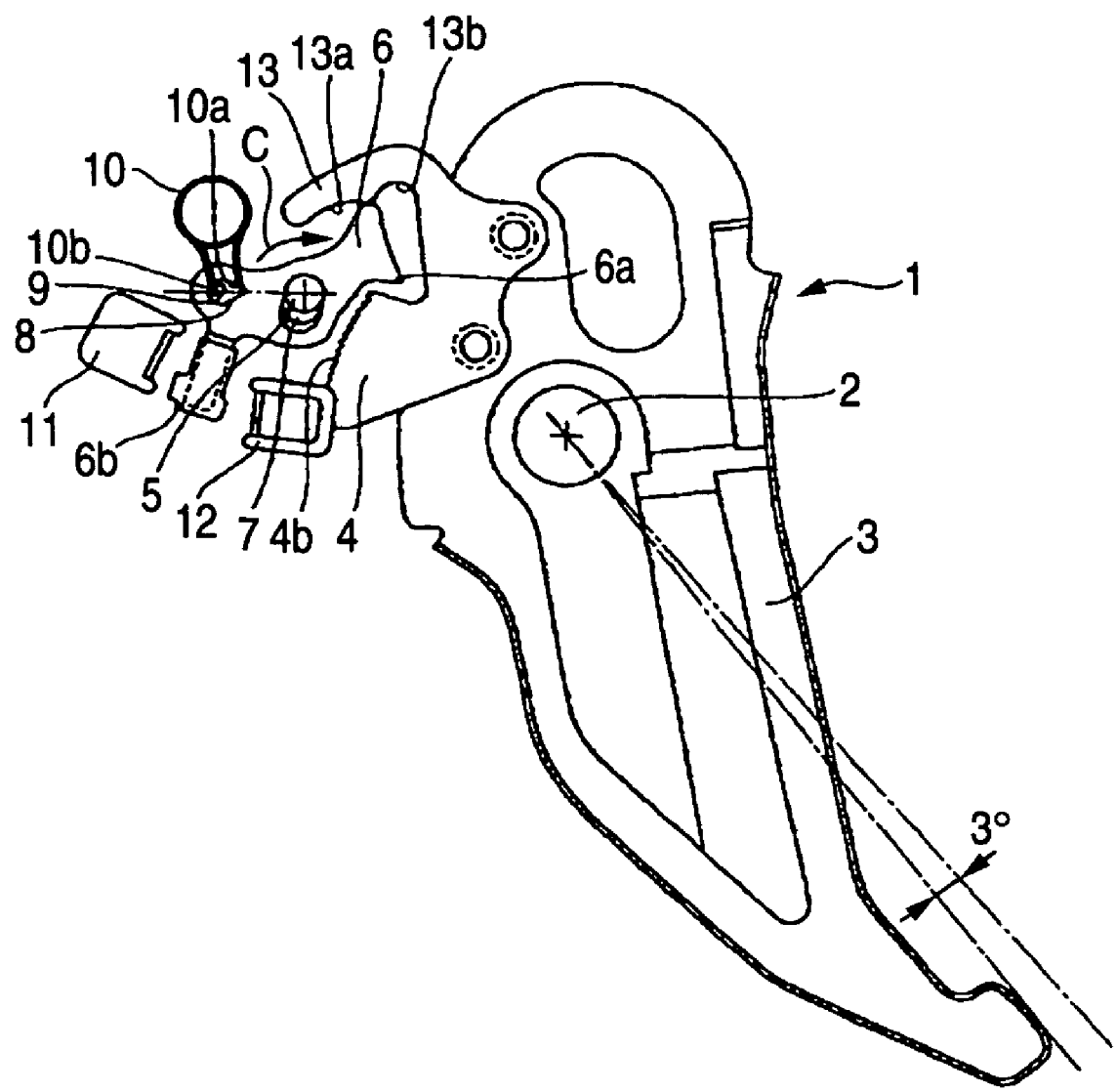
FIG. 6 is a side view showing a state of reversing a toggle spring force.

Further, when the state is progressed, as shown by FIG. 6, rotation of the ratchet pole 6 in the arrow mark C direction is progressed, and the point of operating the toggle spring 10 (that is, the one leg portion 10a) is moved to an upper side of the line connecting the center of the spring hole 9 of the attaching frame and the center of the pivot pin 5. Then, the ratchet pole 6 is added to exert with the turning force in the arrow mark C direction, that is, the direction of bringing the ratchet plate 4 in mesh therewith by the toggle spring 10.

Figure 7:
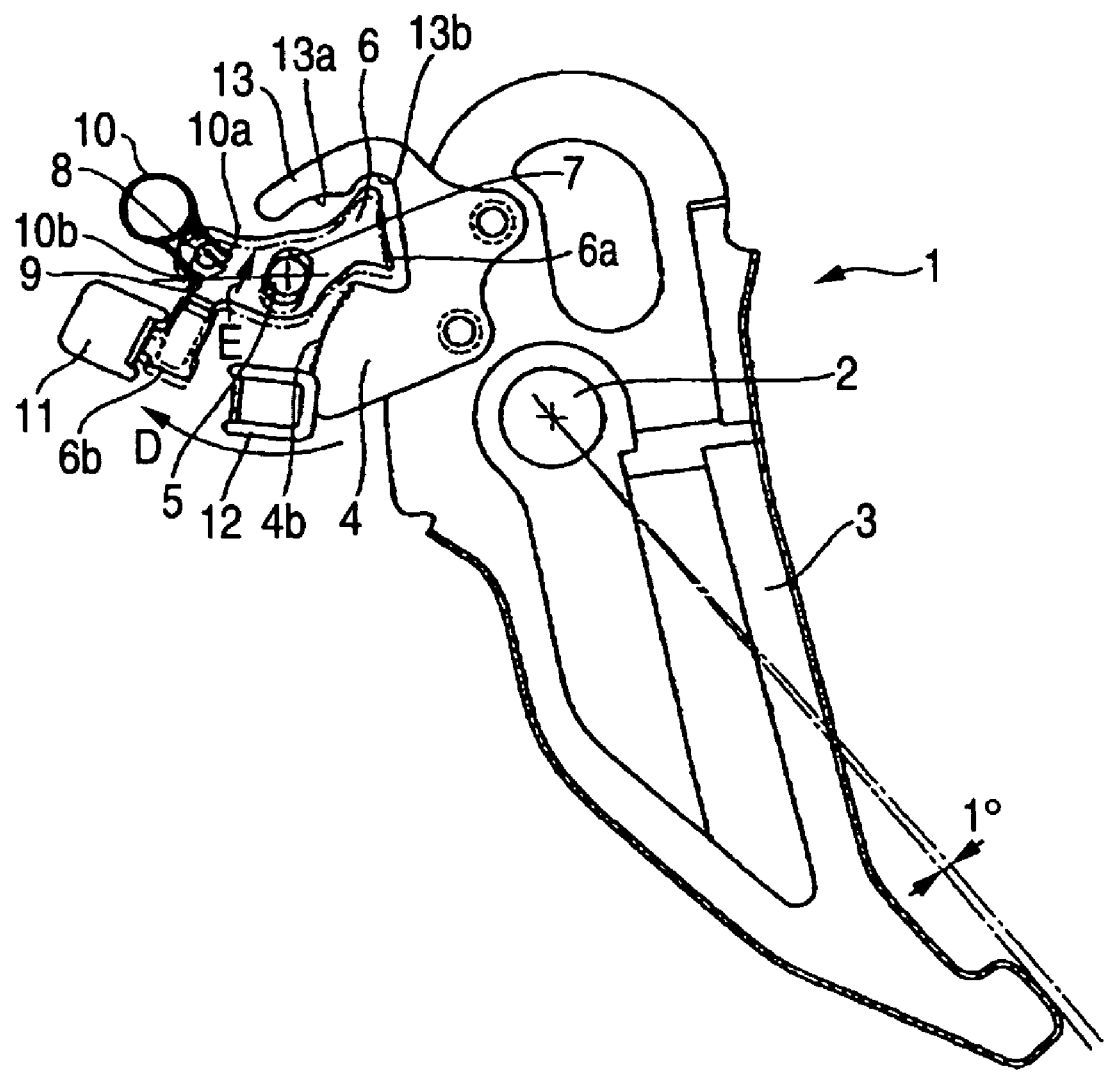
FIG. 7 is a side view showing a state of sliding a ratchet pole.

When a moment arm sufficient for rotating the ratchet pole 6 is produced, as shown by FIG. 7, simultaneously with rotating the ratchet pole 6 in an arrow mark D direction in the drawing, the pivot pin 5 is slid in the long hole 7, as a result, the ratchet pole 6 is slid in an arrow mark E direction, that is, from a position indicated by a one-dotted chain line to a position indicated by a bold line in the drawing. At this occasion, the base end portion of the reset arm portion 13 is formed with the escaping portion 13*b* as the recess portion and therefore, the ratchet pole 6 does not collide with the reset arm portion 13 or the ratchet plate 4, and emittance of strange sound by colliding metals with each other is prevented.

Rotation of the ratchet pole in the meshing direction is restricted by bringing the stop arm portion 6*b* into contact with the stopper 11 to return to the initial state shown in FIG. 1 in a state in which the ratchet pole 6 is contained in the escaping portion 13*b* without being brought into contact therewith.

What is claimed is:

1. A foot depressing parking brake apparatus comprising:
   a brake pedal main body pivotably supported by a support shaft,
   a ratchet plate having ratchet teeth and attached to the brake pedal main body,
   a ratchet pole rotatably attached to a pivot pin and constituting a shaft hole thereof inserted with the pivot pin by a long hole, and
   an elastic member for exerting a turning force to the ratchet pole,
   wherein by sliding the ratchet pole along the shaft hole constituting the long hole by the turning force by the elastic member and
   a force of depressing the pedal main body,
   a brake operating state in which
   a claw portion of the ratchet pole is brought in mesh with the ratchet teeth of the ratchet plate, and
   a brake releasing state in which the meshing is released are realized, the ratchet plate is integrally provided with
   a reset arm portion having an engagement surface that is selectively engaged by the ratchet pole for restricting an attitude of the ratchet pole in releasing a brake,
   wherein the engagement surface is defined by a bent portion and an escaping portion separated from each other by a projection disposed therebetween.

2. The foot depressing parking brake apparatus according to claim 1, further comprising:
   a stopper for restricting rotation of the ratchet pole in the meshing direction, and
   a stopper for restricting rotation thereof in a direction reverse thereto.

3. The foot depressing parking brake apparatus according to claim 1, wherein
   in an initial state of releasing the brake, the ratchet pole is brought into a state of not being brought into contact with the ratchet plate.

4. A foot depressing parking brake apparatus comprising:
   a brake pedal main body pivotably supported by a support shaft,
   a ratchet plate having ratchet teeth and attached to the brake pedal main body,
   a ratchet pole rotatably attached to a pivot pin and constituting a shaft hole thereof inserted with the pivot pin by a long hole, and
   an elastic member for exerting a turning force to the ratchet pole,
   wherein by sliding the ratchet pole along the shaft hole constituting the long hole by the turning force by the elastic member and
   a force of depressing the pedal main body,
   a brake operating state in which
   a claw portion of the ratchet pole is brought in mesh with the ratchet teeth of the ratchet plate, and
   a brake releasing state in which the meshing is released are realized, the ratchet plate is integrally provided with
   a reset arm portion for restricting an attitude of the ratchet pole in releasing a brake, and
   a base end portion of the reset arm portion is formed with an escaping portion in correspondence with the sliding operation in releasing the brake, and
   a stopper for restricting rotation of the ratchet pole in the meshing direction, and a stopper for restricting rotation thereof in a direction reverse thereto.

5. The foot depressing parking brake apparatus according to claim 4, wherein in an initial state of releasing the brake, the ratchet pole is brought into a state of being free from brought in contact with the ratchet plate.

6. A foot depressing parking brake apparatus comprising:
   a brake pedal main body pivotably supported by a support shaft,
   a ratchet plate having ratchet teeth and attached to the brake pedal main body,
   a ratchet pole rotatably attached to a pivot pin and constituting a shaft hole thereof inserted with the pivot pin by a long hole, and
   an elastic member for exerting a turning force to the ratchet pole,
   wherein by sliding the ratchet pole along the shaft hole constituting the long hole by the turning force by the elastic member and
   a force of depressing the pedal main body,
   a brake operating state in which
   a claw portion of the ratchet pole is brought in mesh with the ratchet teeth of the ratchet plate,
   a brake releasing state in which the meshing is released are realized, the ratchet plate is integrally provided with
   a reset arm portion for restricting an attitude of the ratchet pole in releasing a brake, wherein the reset arm portion includes a bent portion configured to directly guide the ratchet pole toward a base end portion of the reset arm portion, and wherein the base end portion is formed with an escaping portion, and
   a stopper for restricting rotation of the ratchet pole in the meshing direction, and a stopper for restricting rotation thereof in a direction reverse thereto.

7. The foot depressing parking brake apparatus according to claim 6, wherein in an initial state of releasing the brake, the ratchet pole is brought into a state of being free from brought in contact with the ratchet plate.

* * * * *